July 25, 1967    J. T. RYMER    3,332,217
CLEANSERS FOR AIR AND OTHER GASES
Filed Nov. 12, 1963    4 Sheets-Sheet 2
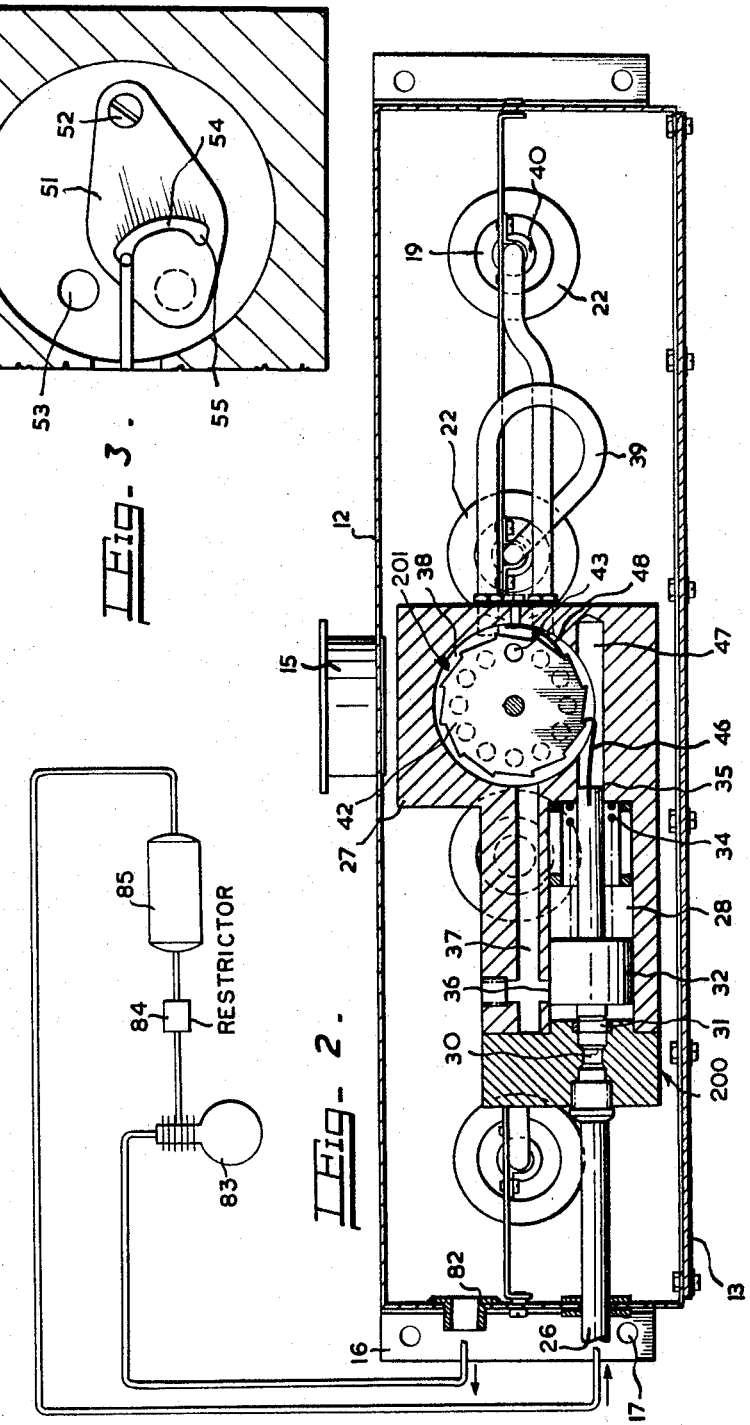

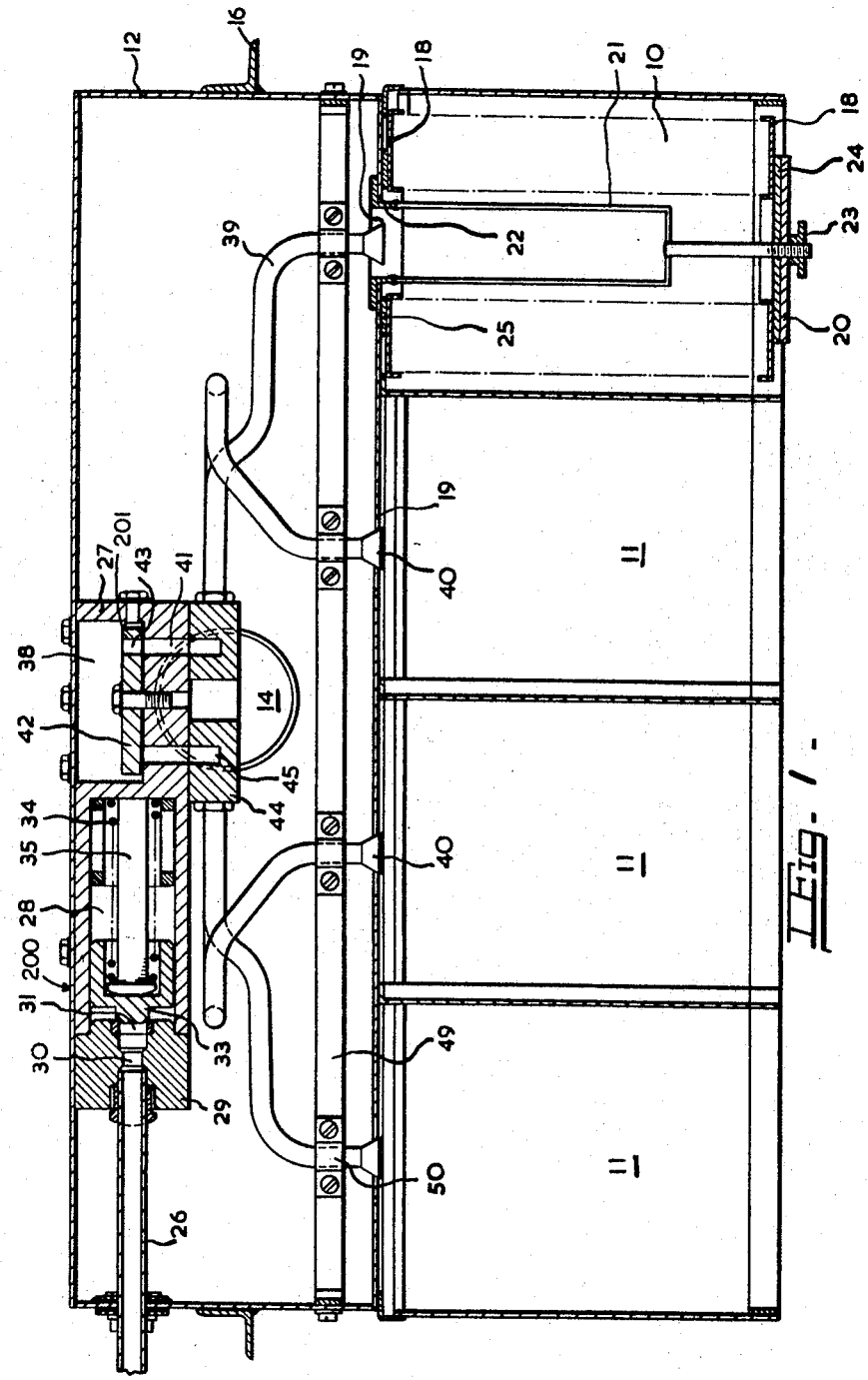

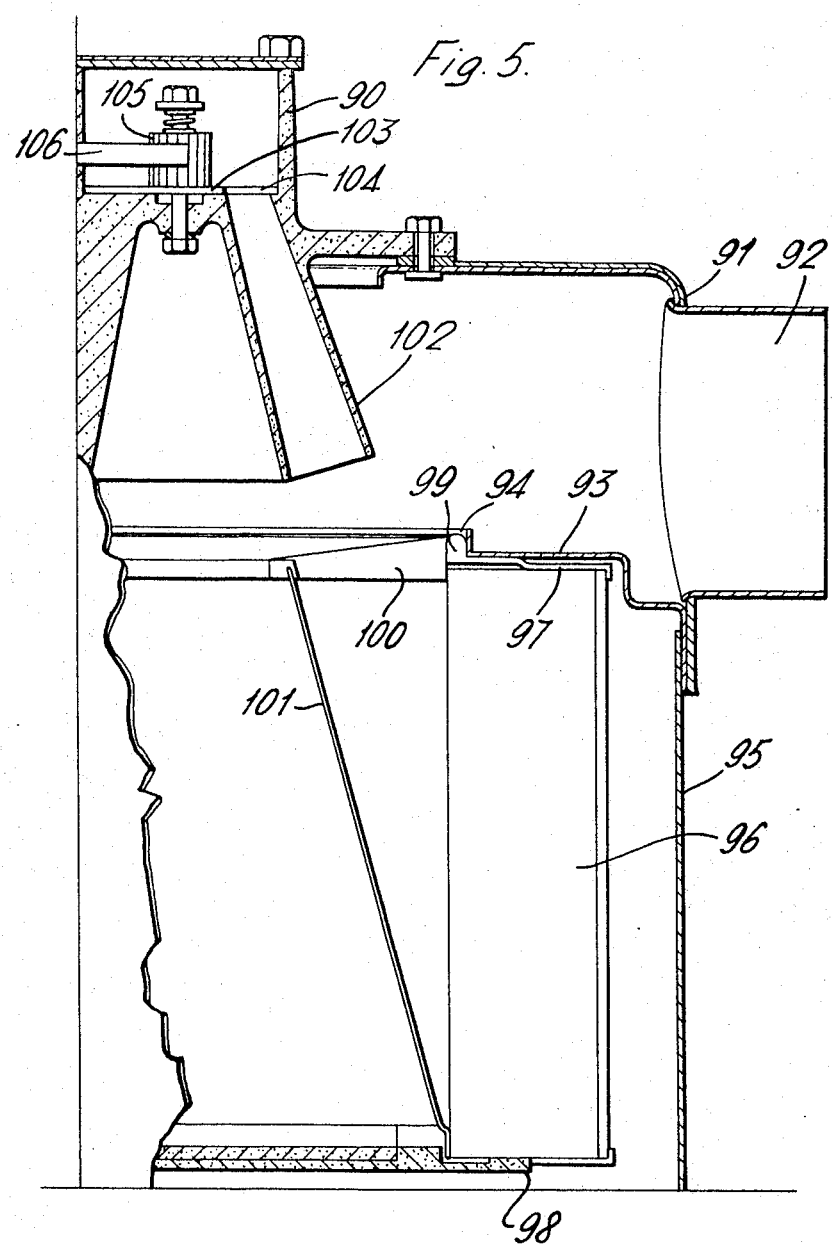

United States Patent Office 3,332,217
Patented July 25, 1967

3,332,217
CLEANSERS FOR AIR AND OTHER GASES
Jesse T. Rymer, Nailsworth, Stroud, England, assignor to J. T. Rymer Limited, a British company
Filed Nov. 12, 1963, Ser. No. 322,799
13 Claims. (Cl. 55—302)

This application is a continuation-in-part of application Ser. No. 36,040 filed June 14, 1960, now abandoned.

This invention relates to a new or improved cleaner for the removal of dust, grit, or other undesirable finely divided particles from air and other gases.

Our improved cleaner is intended primarily for supplying clean air to the internal combustion engines of vehicles, but it can be used for various other purposes. When an internal combustion engine is operating under conditions in which the air contains substantial quantities of dust or grit the rate of wear of the working parts is extremely high, and for the engine to have a working life of reasonable length it is essential to provide effective means for cleaning the air before it is drawn into the engine. The rate of consumption of air by the engine is high, particularly on heavy vehicles, and one of the difficulties to be overcome is the limetd space available for an air cleaner.

One of the objects of our invention is to provide an improved air cleaner which is extremely compact, which is efficient in use, and is continuously self-cleaning so that it will operate over long periods without attention.

In the following description there are described embodiments of our invention which are intended for the purpose of cleaning air but the terms "air" and "compressed air" hereafter used in this specification are intended to include other gases.

In the accompanying drawings

FIGURE 1 is a sectional elevation of one form of air cleaner according to this invention;

FIGURE 2 is a sectional plan of the apparatus shown in FIGURE 1;

FIGURE 3 is a sectional plan of part of a modified air cleaner;

FIGURE 5 shows a sectional elevation of part of a modified construction.

Figure 4:
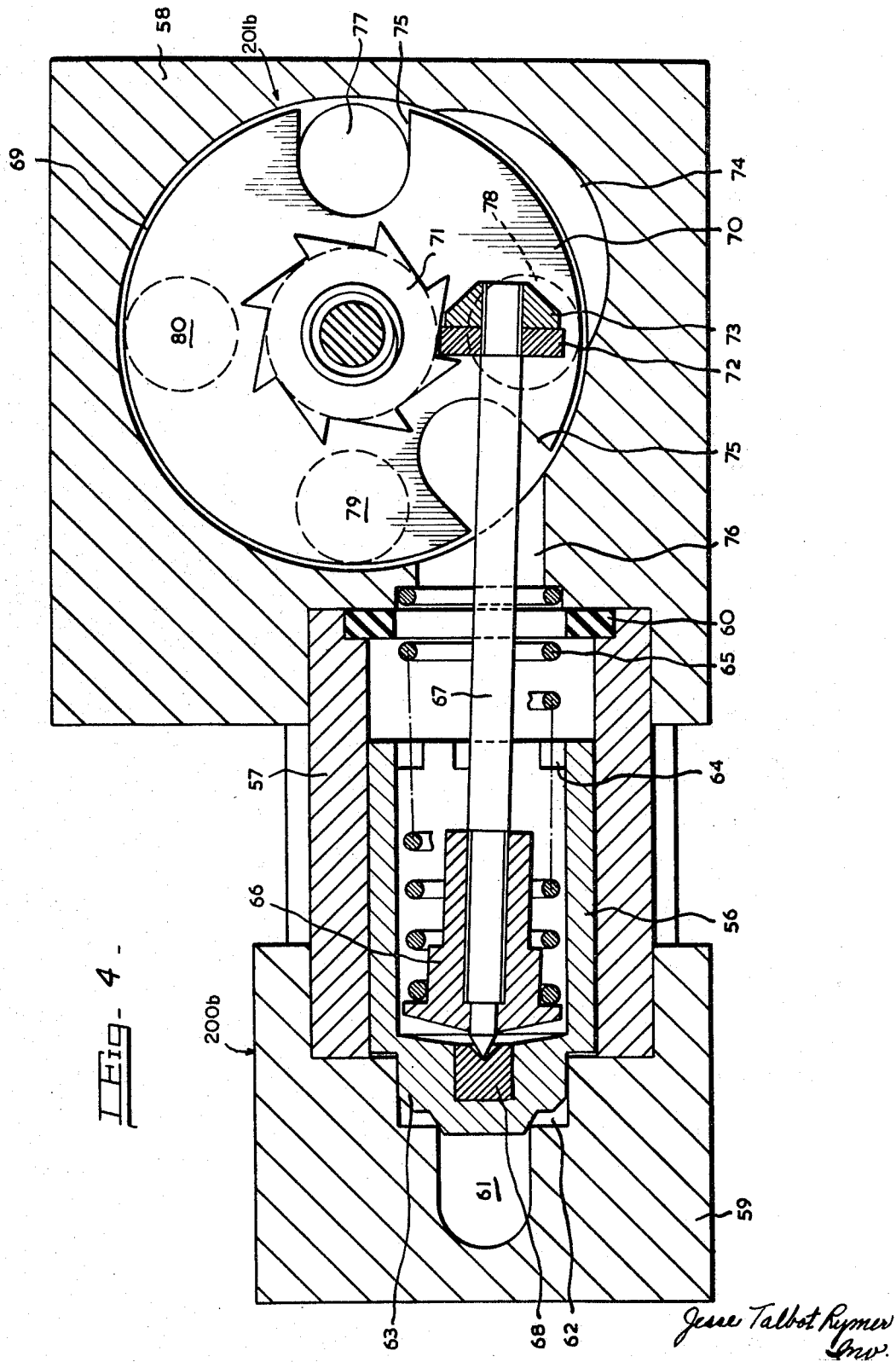
FIGURE 4 is a sectional plan of part of another form of air cleaner in accordance with this invention.

The air cleaner shown in FIGURE 1 comprises a number of independently acting filter elements 10 contained in separate compartments 11 the walls of which depend from a rectangular manifold or casing 12. This manifold has three integral side walls and a fourth side wall which is constituted by a detachable inspection cover 13. One side of the manifold is formed with an outlet 14 including a flanged coupling piece 15 by which the manifold can be connected to the air intake of the apparatus, for example an internal combustion engine, to which clean air is to be supplied. Opposite side walls of the manifold carry attachment brackets 16 formed with holes 17 for bolts by means of which the cleaner can be anchored to a vehicle fixture or to some other foundation. Each filter element is an open-ended tube of felt enclosed between two layers of wire gauze the wall of the tube being radially pleated so that, in section, the tube has the appearance of a multipointed star. The ends of the tube are located in ring-shaped caps 18.

Each compartment 11, which is completely open at the bottom and communicates with the manifold through a central aperture 19 in its top wall, contains but a single filter element, so that the elements are isolated from each other and each performs its functions independently of the others. The filter element is held between the top wall of its compartment and a plate 20 which closes the lower end of the element. The plate is attached to the end of a spider 21 depending into the hollow interior of the element from a ring 22 located in the aperture in the top of the compartment. By removal of the plate, which is held in position by the nut 23, the element can be removed for inspection or replacement. Sealing rings 24, 25 are placed between the plate and the filter and between the filter and the top of the compartment. When suction is applied to the outlet 14 of the manifold, air is sucked upwards into each manifold, air is sucked upwards into each compartment around the lower edge of the filter element, radially inwards through the element into the hollow interior thereof and thence upwards through the aperture 19 into the manifold. Injurious particles of dust, dirt and other foreign matter are thus strained from the air sucked into the filtration unit and are left clinging to the outer surfaces of the filter elements where they gradually accumulate.

The air cleaner includes means for periodically supplying to each filter element a high pressure pulse or blast of scavenging air, which passes through the element in the opposite direction to the normal flow and discharges from the outer surface of the element any foreign matter adhering to it.

Compressed air is supplied through a compressed air line 26 from any convenient source and means for controlling the supply and distribution of the pulses of compressed air are housed in a block 27 situated inside the manifold and bolted to the top wall thereof. The block carries a pressure responsive valve 200 comprising a cylindrical bore 28 the outer end of which is closed by an end cap 29 formed with an inlet passage 30 which opens into the cylindrical bore. The outer end of the inlet passage receives the end of the compressed air line 26. The inner end of the inlet passage constitutes an inlet port 31 controlled by a valve member in the form of a hollow piston 32, which slides in the cylindrical bore 28. The crown of the piston is formed at the centre with a boss or plug 33 of slightly larger diameter than the inlet port, but of considerably smaller diameter than the body of the piston. The plug is formed with a chamfered edge which engages with a seating around the inlet port. The plug is normally held against its seating by a compression spring 34 interposed between the other end of the cylinder and the head of a rod 35 which bears against the piston.

Compressed air is supplied to the other end of the line 26 by, for example, a pump or compressor 83 (see FIGURE 2) driven by the engine to which clean air is supplied, or by any other convenient source. On many heavy vehicles there is a compressed air supply for operating the brakes and other ancillary mechanism and the air can be taken from that source. An air flow restrictor 84, such as a valve having a fine adjustment, is connected in the line downstream of the source or compressor 83, and air is continuously pumped through the restrictor 84 into an air reservoir 85 of substantial capacity which is connected in the line between the restrictor and the inlet port 31. Filtered compressed air for the pump can be drawn from the manifold through the outlet 82.

In the wall of the cylinder there is a port 36, normally covered by the piston 32, through which the bore of the cylinder communicates with a passage 37 leading to a distribution chamber 38. The chamber itself communicates with the outlets 19 of the filter elements through a distribution valve 201, through which compressed air passes to pipes 39 terminating in nozzles 40, which are directed into the outlets of the filter elements.

The bottom of the distribution chamber, which is a flat machined surface, is penetrated by a ring of ports 41 which are equally spaced apart. The ports 41 are controlled by a valve member in the form of a rotary disc 42 having an aperture 43 of the same diameter as the diameters of the ports, the centre of the aperture being at the same distance from the axis of rotation of the disc as the centres of the ports.

It will be seen that there are twelve ports in the base of the distribution chamber, a group of three adjacent ports being associated with each nozzle. Clamped to the bottom of the distribution chamber there is a ring 44 formed with four separate arcuate grooves 45 each of which is associated with three of the ports 41 and one of the nozzles 40.

The periphery of the valve disc is formed with ratchet teeth which are engaged by a pawl 46, the number of ratchet teeth being equal to the number of ports 41. The pawl is a leaf spring anchored at one end to the piston rod 35 and formed at the other end with a hook which engages the ratchet teeth. It should be noted that the cylinder bore 28 has an extension 47 of smaller diameter, the end of the piston rod being a sliding fit in this extension. The pawl is adapted to rotate the disc step by step in a clockwise direction as seen in FIGURE 2, a contrary movement of the disc being prevented by the stop pawl 48 anchored to the wall of the distribution chamber. The stop pawl is also a leaf spring.

Compressed air is continuously delivered from the source 83 to the air reservoir 85 at a predetermined and controllable rate. The air in the reservoir is initially at atmospheric pressure, but the pressure builds up gradually, at a rate determined by the setting of the air flow restriction 84, until it reaches a value such that the force exerted on the plug 33 will exceed the spring loading on the piston. The piston will then move away from its seating and, immediately this happens, the compressed air has access to the full area of the piston which moves rapidly in the cylinder and uncovers the port 36 leading to the distribution chamber. A blast or pulse of high pressure air enters the distribution chamber and passes through the aperture in the disc into whichever port 41 leading to one of the filter elements is in register with the aperture 43 so that the air is forced into the centre of a filter element to discharge any dust or other particles adhering to its surface.

The pressure in the reservoir has then fallen to a low value and the piston is returned by its spring to close the inlet port. In moving backwardly the resilient pawl 46 carried by the piston rod has ridden over one of the peripheral ratchet teeth on the rotary disc and, as the piston and piston rod return, the disc is turned through an angle equal to the tooth spacing to bring the aperture in the disc into alignment with another of the ports 43 leading to a filter element. In this embodiment three blasts of air are delivered in succession to each of the filter elements.

As soon as the plug 33 re-engages its seating the cycle recommences. The air in the reservoir thus undergoes cyclic pressure changes, the maximum pressure attained being determined by the stiffness of the spring 34 and the area of the plug presented to the compressed air inlet. Pulses of compressed air are thus periodically delivered from the reservoir to the distribution chamber and the provision of a differential area piston to control the discharge of compressed air ensures that each discharge is rapid and complete, since the piston moves rapidly to the open position and does not return until the air pressure acting on it is considerably lower than that which caused it to move away from the seating. The frequency with which pulses of scavenging air are delivered to the filter elements can be selected by adjusting the setting of the air flow restrictor.

The pipes 39 leading to the nozzles 40 are clamped to a cross bar 49 in the manifold by straps 50. The nozzles are of flared or bell-mouthed shape, this construction having the advantage that, when scavenging air is being discharged from it, a curtain of air is produced which forms in effect a seal for the opening 19 at the upper end of the filter element and prevents air from being drawn in from the manifold—a circumstance which might lead to the engine or other air using apparatus from being temporarily starved of the air while a filter element is being cleaned.

Where there are only two or three filter elements it may be desirable to design the ends of the pipes 39 in such a way that a certain amount of the air passes upwardly into the manifold to compensate for momentary loss of the air which would normally be drawn in through the filter element being cleaned.

FIGURE 3 shows a modified form of distributor 201a suitable for use where there are only two filter elements. The distribution valve member in this case is an oscillatory plate 51 which swings about a pivot 52. There are two ports 53 in the bottom of the distribution chamber which lead to two nozzles directed into the outlets of separate filter elements. In the plate there is a cam slot 54 formed at its extremities with locating pockets 55 for the hook-like end of an actuator attached to the piston rod of the pressure responsive valve. On each occasion that the pressure responsive valve opens, the actuator reciprocates back and forth and the hook-like end is transferred from one pocket to the other, the plate 51 being simultaneously swung about its pivot to uncover one port and to cover the other.

FIGURE 4 shows modified means for controlling the supply and distribution of scavenging air to the filter elements. In this embodiment the piston 56 of the pressure responsive valve 200b works in an open-ended cylinder barrel 57 which fits at each end into complementary sockets in the distributor block 58 and the end cap 59. The end of the cylinder adjacent the distributor block is fitted with a rubber sealing ring 60. The piston, as before, is a differential area piston and the compressed air inlet 61 opens into a socket 62 which receives the plug 63 formed on the crown of the piston. The piston is hollow and made of impregnated nylon, and its periphery is formed with six axially extending grooves which terminate in notches 64 in the rim of the back end of the piston. The piston is urged into a position closing the compressed air inlet by a compression spring 65 interposed between an annular seating at the back of the cylinder and an aluminum head 66 mounted on a piston rod 67 which bears against the piston. The forward end of the rod is pointed and bears against a conical seating in a magnesium bronze insert or pad 68 embedded in the crown of the piston. The angle of the seating is greater than the angle of the point to allow the rod a degree of lateral mobility with respect to the piston.

The floor of the distribution chamber 69 of the distribution valve 201b is formed with four ports leading to an equal number of filter elements. The ports are covered by a rotary disc 70 of plastics material which carries a stainless steel ratchet wheel 71. The ratchet wheel is fixed to the disc and its periphery is formed with eight ratchet teeth. The pawl in this case is a nylon washer 72 anchored to the tail of the piston rod by a nut 73. A crescent-shaped clearance space 74 is formed in the cylindrical wall of the distribution chamber to accommodate lateral movement of the piston rod as the pawl overrides the teeth of the ratchet wheel. The edge of the disc is formed with two notches 75 which register with the ports in the floor of the distribution chamber. The angle between the notches is equal to the angle encompassing three of the ratchet teeth so that when one of the notches is in register with one of the ports the other is disposed between two adjacent ports.

Pulses of scavenging air are delivered periodically through the compressed air inlet and pass by way of the grooves in the piston and the opening 76 in the back of the cylinder into the distribution chamber, and then through the presently open port to a filter element. On each occasion that the pressure responsive valve opens, the pawl 72 reciprocates and the disc is turned through an angle equal to the angle between adjacent ratchet teeth. Starting from the position shown in FIGURE 4 it will be seen that during each revolution of the disc the ports are exposed in the order 77, 79, 78 and 80, 79, 77, 80, 78. It will be seen that the pawl is held in engagement with the ratchet wheel by the spring 65.

In all the embodiments described in this specification there is no need to provide special sealing means between the distribution valve member and the bottom of the distribution chamber, because the pulses of scavenging air hold the member firmly against the bottom of the chamber and all the scavenging air is delivered to a single filter element.

FIGURE 5 shows a sectional elevation of part of a further embodiment of the invention. In this embodiment the distributor valve 90 is secured in air-tight fashion to the top of a circular manifold 91, which has an outlet 92. The bottom wall 93 of the manifold has a large circular opening 94 in the middle, and a depending cylindrical skirt 95 which contains the multi-section filter.

The filter itself comprises a deeply-pleated cylindrical filter element 96 mounted between top and bottom caps 97 and 98 respectively. So as to prevent air from finding its way between the top of the cap 97 and the bottom wall 93 of the manifold, the cap 97 is formed with an annular bead 99 which bears against wall 93 and fits into the opening 94. The portion of the cap 97 within the bead 99 constitutes the outlet region of the filter element, in which the cap 97 has a number of outlet openings 100. These openings are in register with an equal number of scoops 101 which cover the inside surface of the filter element. Each scoop has a U-shaped horizontal cross-section with its inner curved surface tapering in a radially outward direction from top to bottom of the filter element.

The edges of the two limbs of the scoop lie on vertical lines located between pleats so that the limbs of each scoop are in contact with the limbs of the two adjacent scoops and so that the whole of the filter element 96 is covered internally by the scoops. The top of each scoop is moulded into the cap 97 around the associated one of the openings 100. The bottom of each scoop merges into an arcuate flange on the bottom cap which is, of course, arranged so as to prevent air from flowing straight through the centre of the filter element.

The blow pipes 102 are integral with the bottom of the distributor 90 and their taper and the spacing of their lower ends from the filter outlets is such that the air blast delivered by each blow pipe does not quite fill the entire cross-section of the associated filter outlet. In this construction some of the compressed air flows away from the filter section in the direction of filtering flow while the air blast is being delivered and compensates for the loss of filtering flow. The openings at the upper ends of the blow pipes are controlled by a rotary valve plate 103 with a single aperture 104 therein. The valve plate is rotated by a ratchet wheel 105 driven by pawl 106.

I claim:

1. Filter cleaning apparatus comprising a plurality of filter units each having an inlet and an outlet separated by a filter element, a distribution valve, passages leading from said distribution valve to each of said filter outlets, indexing means operable to connect said distribution valve in succession to each of said filter outlets, by way of said passages, a supply line for the supply of compressed air to said distribution valve, a pressure-responsive valve connected to said supply line, said pressure-responsive valve comprising a valve body having a port therein connected to said supply line, an outlet connected to said distribution valve and a valve closure member in said body, resilient means operative to urge said closure member to close said port, said closure member being movable away from said port in response to a predetermined pressure of air in said supply line to connect said supply line to said distribution valve, transmitting means associated with said closure member and operable on movement of said closure member to actuate said indexing means to connect said passages in succession to said supply line.

2. Filter cleaning apparatus according to claim 1 wherein said filter outlets communicate with a common manifold and each of said passages has a downstream end which terminates in a nozzle mounted in said manifold adjacent but spaced from the outlet of a corresponding filter unit, each nozzle being flared towards its discharge end to permit unrestricted expanding flow therethrough and being directed towards said filter outlet, whereby in operation air discharged from the nozzle forms a curtain around the filter outlet thereby to prevent withdrawal by induced flow of air from said manifold as compressed air passes from said nozzle to said filter outlet.

3. Filter cleaning apparatus according to claim 1 wherein said closure member comprises a body carrying a boss of considerably smaller cross-sectional area than the body, said closure member having a closed position wherein said port is engaged and closed by said boss and said boss is exposed to the pressure of air in said supply line, said closure member being movable away from said closed position in response to a predetermined pressure of air in said supply line whereby said pressure has access to the cross-sectional area of said closure member body.

4. Filter cleaning apparatus according to claim 1 wherein said indexing means comprises a driving member associated with said valve closure member and a driven member connected to said distribution valve, said driving member being operable on movement of said valve closure member to engage said driven member and connect said distribution valve in succession to each of said filter outlets.

5. Filter cleaning apparatus comprising a plurality of filter units each having an inlet and an outlet separated by a filter element, a distribution valve, passages leading from said distribution valve to each of said filter outlets, indexing means operable to connect said distribution valve in succession to each of said filter outlets by way of said passages, a supply line for the supply of compressed air to said distribution valve, a pressure-responsive valve connected to said supply line, said pressure-responsive valve comprising a cylinder having an air port in one end thereof connected to said supply line, a closure member comprising a piston slidably carried in said cylinder, a boss of reduced cross-sectional area on said piston and operable to close said port, spring means urging said piston to close said port, said piston being movable away from said port in response to a predetermined air pressure in said supply line acting upon said boss, said indexing means being associated with said piston and operable on movement of the piston to index said distribution valve.

6. Filter cleaning apparatus according to claim 5 wherein said indexing means comprises a pawl carried by said piston and a co-operating ratchet wheel carried by a rotary valve member within said distribution valve adjacent said passages leading to each of said filter outlets, said valve member being rotatable with said ratchet wheel to place said passages in succession in communication with said supply line through said distribution valve.

7. Filter cleaning apparatus comprising a plurality of filter units each having an inlet and an outlet separated by a filter element, said outlets opening into a common manifold, a distribution valve, passages leading from said distribution valve to each of said filter outlets, each said passage having a downstream end which terminates in a flared nozzle mounted within said manifold in proximity to a respective one of said outlets, indexing means operable to connect said distribution valve in succession to each of said passages, a supply line for the supply of compressed air to said distribution valve, a pressure-responsive valve connected to said supply line and having a port therein in communication with said supply line, a closure member in said valve, resilient means in said valve engaging said closure member and operative to urge said closure member to close said port, said closure member being movable away from said port in response to a predetermined pressure of air in said supply line to connect said supply line to said distribution valve by way of said pressure-responsive valve, said closure member being operatively connected to said indexing means whereby on movement of said closure member said distribution valve is connected in succession to each of said passages.

8. Filter cleaning apparatus according to claim 7 wherein said closure member comprises a body carrying a boss of considerably smaller cross-sectional area than the body, said closure member having a closed position wherein said port is engaged and closed by said boss and said boss is exposed to the pressure of air in said supply line, and on movement of said closure member away from said closed position the entire cross-sectional area of said body is exposed to the pressure of air in said supply line.

9. Filter cleaning apparatus according to claim 7 wherein said pressure-responsive valve comprises a cylinder having an air port in one end connected to said supply line, said closure member comprising a piston slidably carried in said cylinder, a boss of reduced cross-sectional area on said piston and operable to close said port, spring means in said cylinder urging said piston to close said port, said piston being movable away from said closed position in response to a predetermined pressure of air in said supply line acting upon said boss whereby the entire cross-sectional area of said piston is exposed to said pressure, said indexing means comprising a pawl carried by said piston and a co-operating ratchet carried by a rotary valve member in said distribution valve.

10. Filter cleaning apparatus comprising two filter units each having an inlet and an outlet separated by a filter element, said outlets opening into a common manifold, a distribution valve, a passage leading from said distribution valve to each of said filter outlets, means for connecting said distribution valve alternately to each of said passages, a supply line for the supply of compressed air to said distribution valve, a pressure-responsive valve connected to said supply line having a port therein in communication with a resevoir, a closure member in said valve, resilient means engaging said closure member and operative to urge said closure member to close said port, said closure member being movable away from said port in response to a predetermined pressure of air in said supply line thereby to connect said supply line to said distribution valve by way of said pressure responsive valve, said means for connecting said distribution valve alternately to each of said passages comprising an oscillatory member in said distribution valve having a cam slot therein and a driving member carried by said closure member having an actuator engaged in said cam slot whereby on movement of said closure member said actuator and cam slot cooperate to move said oscillatory member and thereby connect said distribution valve alternately to each of said passages.

11. Filter cleaning apparatus according to claim 10 wherein each of said passages terminates in a flared nozzle mounted in said manifold adjacent but spaced from a corresponding filter outlet.

12. Filter cleaning apparatus according to claim 10 wherein said pressure-responsive valve comprises a cylinder having an air port in one end thereof connected to said supply line, said closure member comprising a piston slidably carried in said cylinder, a boss of reduced cross-sectional area on said piston and operable to close said port, spring means in said cylinder urging said piston to close said port, said piston being movable away from said closed position in response to a predetermined pressure of air in said supply line acting upon said boss whereby the entire cross-sectional area of said piston is exposed to said pressure, said actuator being carried by said piston.

13. Filter cleaning apparatus according to claim 11 wherein said pressure-responsive valve comprises a cylinder having an air port in one end thereof connected to said supply line, said closure member comprising a piston slidably carried in said cylinder, a boss of reduced cross-sectional area on said piston and operable to close said port, spring means in said cylinder urging said piston to close said port, said piston being movable away from said closed position in response to a predetermined pressure of air in said supply line acting upon said boss whereby the entire cross-sectional area of said piston is exposed to said pressure, said actuator being carried by said piston.

References Cited

UNITED STATES PATENTS

| | | | |
|---|---|---|---|
| Re. 24,954 | 3/1961 | Church | 55—302 |
| 1,287,975 | 12/1918 | Haatvedt | 137—625.45 |
| 1,630,212 | 5/1927 | Overton | 251—230 |
| 2,255,519 | 9/1941 | Preston | 55—293 |
| 2,391,534 | 12/1945 | Yerrick et al. | 55—287 |
| 2,429,751 | 10/1947 | Gohr et al. | 55—302 |
| 2,478,702 | 8/1949 | Moody | 251—230 |
| 2,576,656 | 11/1951 | Wallin | 55—283 |
| 2,844,216 | 7/1958 | Swanson | 55—287 |
| 2,850,112 | 9/1958 | Dru | 55—304 |
| 2,980,207 | 4/1961 | Allen | 55—283 |
| 3,027,094 | 3/1962 | Phillips | 239—66 |
| 3,234,714 | 2/1966 | Rymer et al. | 55—302 |

FOREIGN PATENTS

| | | |
|---|---|---|
| 812,244 | 4/1959 | Great Britain. |
| 74,136 | 2/1954 | Netherlands. |

HARRY B. THORNTON, *Primary Examiner.*

B. NOZICK, *Assistant Examiner.*

UNITED STATES PATENT OFFICE
CERTIFICATE OF CORRECTION

Patent No. 3,332,217                      July 25, 1967

Jesse T. Rymer

It is hereby certified that error appears in the above numbered patent requiring correction and that the said Letters Patent should read as corrected below.

In the heading to the printed specification, lines 3 and 4, for "assignor to J. T. Rymer Limited, a British company" read -- assignor, by mesne assignments, to Gerald Cobham Griffith, Solicitor, London, England --.

Signed and sealed this 20th day of August 1968.

(SEAL)
Attest:

Edward M. Fletcher, Jr.                      EDWARD J. BRENNER

Attesting Officer                            Commissioner of Patents